US005749310A

United States Patent [19]
Klinkner et al.

[11] Patent Number: 5,749,310
[45] Date of Patent: May 12, 1998

[54] PLANTER HEX DRIVE SHAFT REPAIR KIT

[75] Inventors: Allen O. Klinkner, Lake Crystal; Larry R. Hancock, North Mankato, both of Minn.

[73] Assignee: Alwyn Company, Inc., Mankato, Minn.

[21] Appl. No.: 642,884

[22] Filed: May 6, 1996

[51] Int. Cl.[6] .................................................. B65G 23/06
[52] U.S. Cl. ........................ 111/200; 403/286; 403/287; 403/306; 403/362
[58] Field of Search .......................... 111/200; 403/286, 403/287, 300, 305, 306, 341, 362

[56] References Cited

U.S. PATENT DOCUMENTS

| | | | |
|---|---|---|---|
| 373,443 | 11/1887 | Culver | 403/306 |
| 855,677 | 6/1907 | Thompson | 403/306 X |
| 1,046,846 | 12/1912 | Ordway et al. | 403/306 X |
| 1,377,418 | 5/1921 | Krogh | 403/306 |
| 1,466,735 | 9/1923 | Williams | 403/306 X |
| 1,555,847 | 10/1925 | Hudson | 403/306 |
| 1,977,343 | 10/1934 | Matthes | 403/306 X |
| 2,025,567 | 12/1935 | Brown | 403/383 X |
| 2,804,732 | 9/1957 | Brockley | . |
| 2,818,008 | 12/1957 | Fulper et al. | 403/306 X |
| 2,890,018 | 6/1959 | Johnson | 403/383 X |
| 3,304,796 | 2/1967 | Leege | 403/383 X |
| 3,462,021 | 8/1969 | Hawke et al. | 403/306 X |
| 4,653,745 | 3/1987 | Nakao et al. | 403/362 X |
| 4,865,183 | 9/1989 | Hodlewsky et al. | . |
| 5,544,740 | 8/1996 | Kissee | 403/362 X |

Primary Examiner—Terry Lee Melius
Assistant Examiner—Christopher J. Novosad
Attorney, Agent, or Firm—Craig J. Lervick

[57] ABSTRACT

A repair kit is provided for quickly and efficiently repairing a hex drive shaft on an agricultural planter. The invention provides a repair sleeve which is closely coupled with the broken or cut hex drive shaft. This repair sleeve is then attached to either side of a broken drive shaft thus allowing the planter to become operable once again. Utilizing the present invention to accomplish the repair, the planter is quickly and efficiently fixed using a small number of tools and not requiring transportation to a repair facility.

3 Claims, 2 Drawing Sheets

PLANTER HEX DRIVE SHAFT REPAIR KIT

BACKGROUND OF THE INVENTION

The present invention relates generally to a quick and efficient way to repair farm machinery. More specifically, the present invention relates to a repair kit for easily accomplishing field repairs of planter drive shafts.

As is well known by those involved in modern day farming, spring planting season is a very busy and very critical time of year. It is critical that crops are planted at appropriate times so as to maximize their growing season and thus maximize crop productions. Planting season can be very hectic due to the many variables which exist. Specifically, the weather and the conditions of the fields will dictate when the most appropriate planting time is. The amount of moisture received during the winter season, the amount of rain or moisture received during the spring or melting season, the temperatures the fields have seen, and the amount of sunlight to which the fields have been exposed, all contribute to the planting conditions of the fields. Each of these factors affect the planting conditions of the field, and none of these factors can be controlled by the farmer.

Due to the large number of uncontrollable factors effecting planting, when conditions are right it is critical that the farmer be able to plant. Also, when the farmer has an opportunity to plant crops, it is important that they make the best use of their time in order to accomplish necessary planting.

As is also well known, large mechanical planters are commonly used to plant crops. These planters effectively and efficiently plant crops in manageable configurations so they can be easily cultivated and harvested at the appropriate times. This typically involves planting crops in parallel rows across a very large field. To accomplish this type of planting, the planter will have a number of parallel planting or seed handling mechanisms which uniformly plant seeds in rows.

In order to allow each seed handling mechanisms to operate, a drive shaft is used to provide the necessary power for all these mechanisms. The drive shaft will extend from one seed handling mechanism to another and thus transfer rotational power to each mechanism. The shaft is configured to drive each of the many elements on the planter. One method of accomplishing this is by configuring the shaft to have a hexagonal cross-section. Realistically, any type of cross-section will work; however, those having a polygonal shape are much more efficient because elements can easily be mounted thereon and an appropriate force can be transferred without the shaft slipping. A planar surface of some type is beneficial as it can easily be coupled to elements of the planter mechanisms and rotational force can easily be transferred thereto.

As with all mechanical devices which transfer forces from one element to another, the drive shaft used on the planter is susceptible to breakage. Because the shaft is transferring force to numerous elements, and because it is impractical to create an indestructible shaft, the torque on the shaft can create a shearing between elements. The shearing will cause the shaft to split in two, thus making it non-functional and useless. Typically, breakage occurs at a midpoint between elements as the shearing forces at that point are the greatest.

As mentioned above, the operation of planting every spring is critical to the success of the farm. Mechanical breakdowns and "downtime" due to mechanical failures is very undesirable. Obviously if a drive shaft on a planter breaks, planting operations come to a halt until the planter can be repaired. Once such breakage occurs, the farmer has a number of options available to them; however, none of the options are particularly appealing. For example, to perform the necessary repairs the farmer must first typically bring the planter back to a shop or garage of some type. In order to accomplish the repair, the shaft could be welded by the farmer in their shop; however, this again takes time and is not the most successful option. A second option is to travel to a farm implement dealer and obtain a new drive shaft. Of course, it is always possible that the implement dealer will not have the appropriate drive shaft. Replacement of the drive shaft is then very complicated and can be expensive.

Another alternative is for the farmer to simply purchase a number of planters. Therefore, when one breaks, a second planter can be utilized. This option is not practical for most modern day farmers, however, as equipment costs tend to be very high and it is not economical to have very expensive equipment sitting idle.

As can be seen from the above discussion, when a planter shaft breaks, it is very critical that the planter be repaired as quickly as possible. This will allow the farmer to begin planting once again. Additionally, the expense incurred in this repair will ultimately affect the profits made at the end of the growing season. Therefore, it is helpful if the repairs are somewhat inexpensive as well.

In addition to the above mentioned breakage, occasionally it is necessary for the farmer to "intentionally break" the drive shaft on the planter. It is becoming increasingly popular to plant row crops fairly close together (i.e. closer together than is typically done at the present time). In order to accomplish this, it is necessary to reposition the seed-handling units on the planter and alter the length of the drive shafts. To accomplish this, typically the drive shaft is removed from the planter and cut to the desired length. Once cut, the drive shaft is then replaced.

As would be expected, this cutting of drive shafts leaves additional fragments or parts which will not be used in their previous positions. Furthermore, because the seed handling units are closer together, a single planter can accommodate more seed handling units. To accommodate this reconfigured planter, it is necessary to either purchase additional drive shaft elements, or to use the remaining parts which have been cut off from the existing drive shafts. At the present time, there does not exist a mechanism to allow the reuse of these cut segments or portions. Therefore, it is necessary for the farmer to purchase additional parts.

SUMMARY OF THE INVENTION

The present invention provides a repair system for quickly and easily repairing broken drive shafts. The repair system of the present invention is a small device which can easily be carried along with the farmer in the cab of a tractor or in a pickup to the field. Additionally, the device of the present invention is easy to install and operate requiring only a few tools for implementation. Lastly, the device accomplishes the repair quickly and easily, thus getting the farmer back in operation very quickly without leaving the field.

The present device involves a sleeve assembly which is configured to surround the drive shaft on either side of the break. The sleeve has connection or attachment mechanisms on either end thereof, which can be secured to the drive shaft. The repair sleeve has a substantially cylindrical outer wall and a plurality of planar inner surfaces to interact with the drive shaft.

The holding mechanism comprises two holding screws which are positioned and aligned to be perpendicular to the cylindrical axis of the repair sleeve. The holding screws are located on either end of the sleeve. These holding screws extend beyond an inner surface of the sleeve to interact with the drive shaft. By turning down these screws, force is imparted on one side of the shaft. This causes the shaft to interact with other inner planar surfaces of the repair sleeve, thus holding the shaft in place. Each of these holding screws can then be tightened down to hold the sleeve in close relation to the drive shaft, thus allowing the shaft to be functional once again.

It is an object of the present invention to provide a repair kit which easily accomplishes repairs of broken drive shafts. This repair must easily be accomplished while still in the field.

It is another object of the present invention to provide a repair system which can be used while the farmer is still in the field thus not forcing them to travel back to their shop or garage for repairs.

It is yet another object of the present invention to provide a repair kit for repairing drive shafts on planters which requires the use of a small number of tools. This object is further accomplished by having a simple and uncomplicated device.

It is yet another object of the present invention to provide a repair kit which is small and easily transportable by the farmers. A large repair kit is unusable as a farmer typically does not have room or space to carry large mechanical devices.

It is a further object of the present invention to provide a repair mechanism for repairing drive shafts which have intentionally been cut. This mechanism then provides flexibility to the farmer in configuring their planters as desired.

BRIEF DESCRIPTION OF THE DRAWINGS

The present invention will be better understood by reading the following Detailed Description and drawings in which.

DETAILED DESCRIPTION OF THE INVENTION

Figure 1:
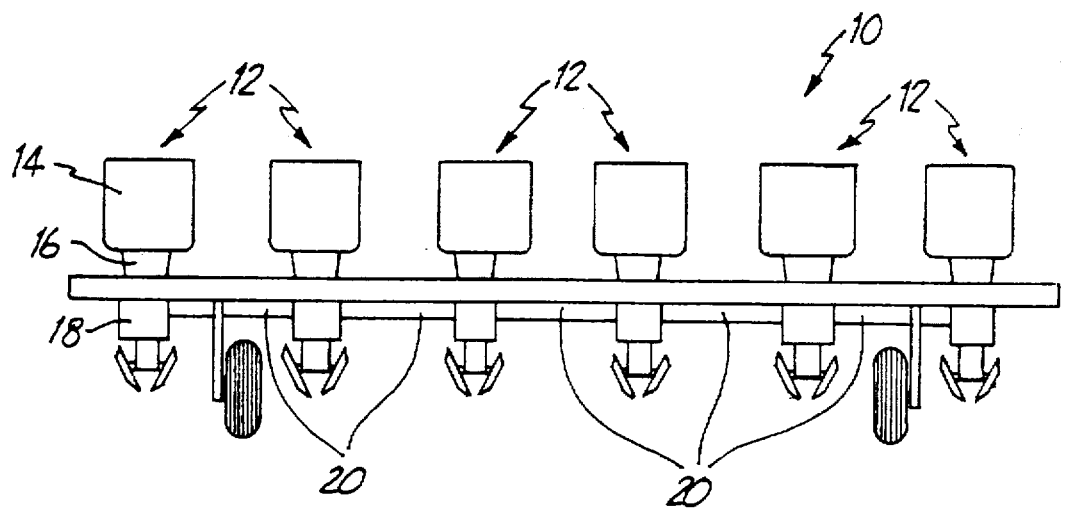
FIG. 1 is a rear view of an agricultural planter.

Referring now to FIG. 1, there is shown a rear view of a planter 10. Planter 10 has a number of seed planting assemblies 12, each of which are identical to one another and each of which operate to handle and plant seeds. In operation, a large quantity of seeds are placed in each seed hopper 14 for planting. The seeds are then transferred through a funnel or trough 16 to a seed unit 18. Each seed unit 18 then operates to individually receive the seed and plant it in the ground. As there are a number of seed planting assemblies 12 aligned on a single planter 10, a number of rows of seeds will be planted when planter 10 is pulled along the ground. Between each seed unit are drive shafts 20. This drive shaft 20 picks up its power from drive wheels (not shown) as the planter is pulled along the ground. Drive shaft 20 then transfers power to each seed unit 18 in order facilitate the handling of seeds.

In order to provide flexibility to the farmer as they are planting their crops, each seed planting assembly 12 is adjustable on the planter 10 to allow the farmer to set the distance between rows. Therefore the farmer can control wider or narrower rows by adjusting the position of each seed planting assembly 12. The planter of FIG. 1 includes a single row of seed planting assemblies 12. It is understood that the present invention is applicable to a planter having multiple rows of seed planting assemblies 12 which would be staggered from one another. This configuration would provide for the planting of numerous rows of crops.

Figure 2A:
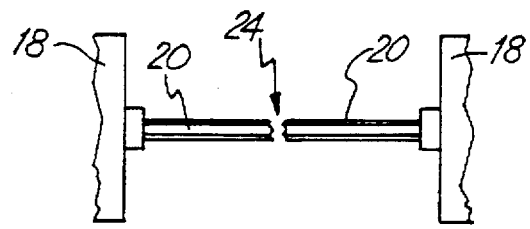
FIG. 2 is an isolated drawing showing a broken hex drive shaft (FIG. 2a) and a repaired hex drive shaft (FIG. 2b)

Referring now to FIG. 2 there is shown a more detailed view of drive shaft 20. As stated above, each drive shaft 20 extends between the different seed units 18. FIG. 2a demonstrates a common situation wherein drive shaft 20 will break at a point between the two seed units 18. This break causes a separation 24 in drive shaft 20. Such a break or separation 24 will render the planter 10 inoperable. As can be appreciated, this breakdown or inoperability of the planter is very detrimental to the farming operation. Especially unfortunate are the situations where this break or separation 24 occurs in the middle of planting operations. In this situation, the farmer is typically in the middle of a field thus making repairs extremely difficult.

Figure 2B:
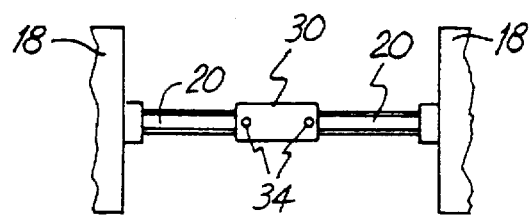

FIG. 2b shows a repaired drive shaft using the repair kit of the present invention. The repaired drive shaft includes the broken shaft members 20 and a repair sleeve 30 closely coupled with the two members of the drive shaft. Included in the repair sleeve are a pair of threaded holes which would receive a pair of set screws 34.

Figure 3:
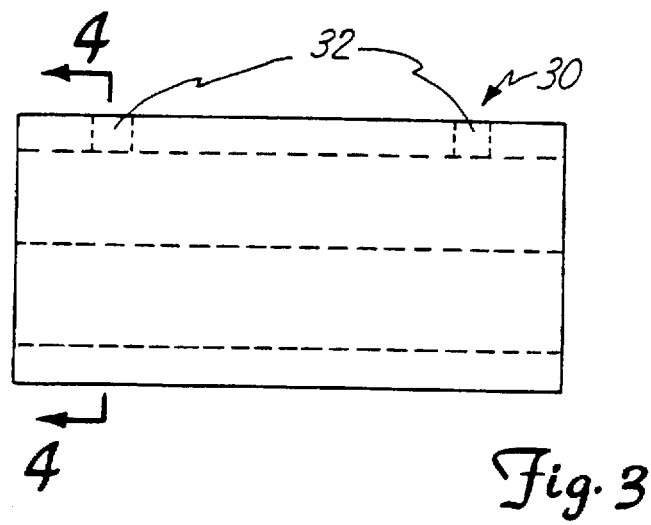
FIG. 3 is a side view of the repair sleeve.
Figure 4:
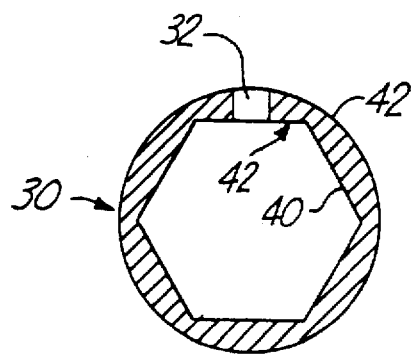
FIG. 4 is a cross-sectional view of the repair sleeve.

Referring now to FIG. 3, there is shown a side view of the repair sleeve of the present invention. Also, shown in FIG. 4 is a cross-sectional view of repair sleeve 30. As can be seen by these two figures, the repair sleeve has an exterior surface which is substantially cylindrical. Repair sleeve 30 has an interior surface 40 which is hexagonal in cross-section. The surface is set up to correspond and fit tightly with the hexagonal cross-section of the drive shaft. Also shown in both FIGS. 3 and 4 are a pair of threaded holes 32 on repair sleeve 30. Threaded holes 32 are configured to have their central axis perpendicular to one of the planar inner surfaces 44.

In operation when drive shaft 20 breaks, the present invention allows the farmer to quickly and easily repair that shaft. More importantly, the farmer is then capable of getting up and running once again. When drive shaft 20 breaks, the farmer simply will take repair sleeve 30 of the present invention and place it over the separation 24 of the shaft 20. Repair sleeve 30 must be positioned such that separation 24 is situated substantially in the center of the sleeve. After such positioning, set screws 34 are tightened down thus holding repair sleeve 30 in place.

In the preferred embodiment, the drive shaft 20 of the planter is approximately seven-eighths inch (⅞") in diameter. The corresponding repair sleeve 30 is just slightly larger than seven-eighths inch (⅞") at its inside diameter. Therefore, repair sleeve 30 will fit tightly over drive shaft 24 with very little tolerance therebetween. These tight tolerances operate to improve the strength and durability of this repair. In an alternative embodiment, the drive shaft is approximately nine-sixteenths of an inch (%16") in diameter. In this embodiment, the repair kit of the present invention has a corresponding inside diameter of approximately nine-sixteenths of an inch as well.

Another use for the repair sleeve of the present invention occurs when a farmer is adjusting the setup of planter 10. As previously mentioned, seed planting assemblies 12 are adjustably mounted on the framework of planter 10. When the farmer desires to place crop rows at different distances from one another, this adjustability allows the seed planting assemblies to be positioned appropriately.

When the seed planting assemblies are being adjusted, the drive shafts extending between the seed units 18 must be appropriately dimensioned. Many times this involves removing a shaft and cutting it to an appropriate size. Often, it is not efficient to purchase new shaft portions. Therefore the present invention allows a farmer to cut two pieces of shaft and couple them together so as to quickly and conveniently reposition seed planting assemblies 12.

Having described the present invention in considerable detail, it is understood that various embodiments of the invention are covered by the claims of this patent. We claim all modifications coming within the scope and spirit of the following claims.

It is claimed:

1. A repaired agricultural planter, comprising;

a plurality of seed planting assemblies for handling and planting seeds, the plurality of seed planting assemblies attached to the planter so as to plant seeds in a plurality of rows as the planter is pulled across the ground;

a power generating apparatus attached to the planter for generating rotational power and providing such rotational power to a transfer mechanism;

a plurality of drive shafts hexagonal in cross-section connected to the seed planting assemblies and the power generating apparatus transfer mechanism, the plurality of drive shafts for transferring rotational power from the transfer mechanism to each of the seed planting assemblies, wherein one of the plurality of drive shafts includes a discontinuity;

a substantially cylindrical repair sleeve attached to the discontinuous hex drive shaft, the repair sleeve having an inner surface configured to closely surround the discontinuous drive shaft such that each of the plurality of planar surfaces of the drive shaft is in juxtaposition with a corresponding portion of the repair sleeve inner surface;

a first holding mechanism attached to the repair sleeve capable of interacting with one of the plurality of planar surfaces, the first holding mechanism attached to the repair sleeve at a first axial end thereof; and a second holding mechanism attached to the repair sleeve capable of interacting with one of the plurality of planar surfaces, the second holding mechanism attached to the repair sleeve at a second axial end thereof, the second axial end and the second axial end being opposite one another.

2. The repaired planter of claim 1 wherein the first holding mechanism includes a first threaded hole extending through the substantially cylindrical repair sleeve and a first holding screw inserted into the first threaded hole and the second holding mechanism include a second threaded hole extending through the substantially cylindrical repair sleeve and a second holding screw inserted into the second threaded hole, the first threaded hole and the second threaded hole situated substantially perpendicular to a central axis of the cylindrical repair sleeve.

3. The repaired planter of claim 2 wherein the first holding screw and the second holding screw both extend beyond the inner surface of the holding sleeve and contact the drive shaft.

* * * * *